(12) United States Patent
Widener et al.

(10) Patent No.: US 7,908,841 B2
(45) Date of Patent: Mar. 22, 2011

(54) GASIFIER AND CYCLONE SEPARATOR FOR COAL COMBUSTION

(75) Inventors: Stanley Kevin Widener, Greenville, SC (US); Lewis Berkley Davis, Jr., Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 240 days.

(21) Appl. No.: 12/247,706

(22) Filed: Oct. 8, 2008

(65) Prior Publication Data

US 2010/0083882 A1    Apr. 8, 2010

(51) Int. Cl.
F02B 43/00 (2006.01)

(52) U.S. Cl. ........................ 60/39.12; 422/224

(58) Field of Classification Search ............... 60/39.465, 60/39.12; 110/232; 422/224
See application file for complete search history.

(56) References Cited

U.S. PATENT DOCUMENTS

| | | | |
|---|---|---|---|
| 3,446,012 A * | 5/1969 | Foster-Pegg | 60/781 |
| 4,089,631 A | 5/1978 | Giles | |
| 4,183,208 A * | 1/1980 | Horgan et al. | 60/39.12 |
| 4,592,199 A | 6/1986 | Huber | |
| 4,600,414 A * | 7/1986 | Metcalfe et al. | 55/290 |
| 4,651,522 A | 3/1987 | Huber | |
| 4,909,030 A | 3/1990 | Ishihara | |
| 4,960,056 A | 10/1990 | Pillsbury | |
| 4,961,389 A | 10/1990 | Pillsbury | |
| 5,022,329 A * | 6/1991 | Rackley et al. | 110/234 |
| 5,079,909 A | 1/1992 | Bruckner et al. | |
| 5,161,367 A | 11/1992 | Scalzo | |
| 5,165,236 A * | 11/1992 | Nieminen | 60/39.464 |
| 5,243,922 A * | 9/1993 | Rehmat et al. | 110/233 |
| 5,272,866 A * | 12/1993 | Nieminen | 60/772 |
| 5,509,264 A | 4/1996 | Ito et al. | |
| 5,918,466 A | 7/1999 | Cloyd et al. | |

* cited by examiner

Primary Examiner — Michael Cuff
Assistant Examiner — Phutthiwat Wongwian
(74) Attorney, Agent, or Firm — Cantor Colburn LLP

(57) ABSTRACT

A direct-fired coal combustion system includes a swirl chamber having an input configured to receive a coal-water slurry and causing the coal-water slurry to mix with discharge air from a compressor to gasify the coal-water slurry and create a synthesis gas. The system also includes a cyclone separator directly coupled to the second end of the swirl chamber and a second stage combustion input coupled to an output of the cyclone separator.

17 Claims, 3 Drawing Sheets

GASIFIER AND CYCLONE SEPARATOR FOR COAL COMBUSTION

BACKGROUND OF THE INVENTION

The subject matter disclosed herein relates to energy production and, in particular, to direct-fired coal combustion in a gas turbine.

An Integrated Gasification Combined Cycle (IGCC) is a clean coal technology that turns coal into gas—synthesis gas (syngas). It then removes impurities from the coal gas before it is combusted. This results in lower emissions of sulfur dioxide, particulates and mercury. It also results in improved efficiency compared to conventional pulverized coal. Existing IGCC plants entail significant capital equipment to perform coal gasification plus cleanup of the resultant syngas to prevent carryover of particulate matter to the gas turbine.

A fundamental problem is the cost and complexity of an IGCC plant that makes it difficult to compete with conventional coal-fired boilers. The ability to direct-fire coal in a combined-cycle plant will reduce greenhouse gas (GHG) emissions due to higher combined cycle (CC) efficiency. The associated problem is that direct-firing coal in a gas turbine causes significant rates of hot gaspath erosion or deposition and performance degradation.

Ash and noncombustibles in the solid coal fuel are addressed in the conventional IGCC plant via post-treatment and separation equipment, as well as heat exchange with the syngas to reduce its temperature to an acceptable level for the separation equipment. One approach has been to perform staged combustion and particulate separation in silo equipment separate from the gas turbine. Another approach has been to use an offboard fluidized-bed combustor as a gasifier, followed by an onboard lean combustor.

BRIEF DESCRIPTION OF THE INVENTION

According to one aspect of the invention, a direct-fired coal combustion system is provided. The system of this embodiment includes a swirl chamber having an input configured to receive a coal-water slurry. The swirl chamber causes the coal-water slurry to mix with discharge air from a compressor to gasify the coal-water slurry and create a synthesis gas. The swirl chamber also has a second end configured to expel the synthesis gas. The system of this embodiment also includes a cyclone separator directly coupled to the second end of the swirl chamber. The cyclone separator has an extraction port and causes particulate matter in the synthesis gas to accumulate at a periphery of the cyclone separator. The cyclone separator also has an output that outputs a rich gas stream. The system also includes a second stage combustion input coupled to the output of the cyclone separator.

According to another aspect of the invention an integrated gasification combined cycle plant is provided. The plant of this embodiment includes a gas turbine having a second stage combustion input and a swirl chamber. The swirl chamber of this embodiment includes an input configured to receive a coal-water slurry and cause coal-water slurry to mix with discharge air from a compressor to gasify the coal-water slurry and create a synthesis gas. The swirl chamber also has a second end configured to expel the synthesis gas. The plant of this embodiment also includes a cyclone separator directly coupled to the second end of the swirl chamber and having an extraction port and causing particulate matter in the synthesis gas to accumulate at a periphery of the cyclone separator. The cyclone separator also has an output that outputs a rich gas stream to the second stage combustion input.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In an IGCC plant, embodiments of the present invention may be utilized to improve the hot gas path life providing systems and methods to remove most, but not all, of the particulate. In one embodiment, the present invention includes a coal gasifier, a cyclone separator for particulate (ash, slag) removal, a second combustion stage to burn the syngas, and a transition into the hot gaspath contained in a gas turbine. In one embodiment, the second stage combustion stage may include a similar architecture to a conventional industrial can combustor. In one embodiment, the gasifier may be either a separate silo-type unit in close proximity to the gas turbine, with a cooled duct leading the syngas to the second stage, or it could be integrated with the can combustor architecture. In one embodiment, the system would be integrated into a conventional combined-cycle plant with a heat recovery steam generator (HRSG) and steam turbine. A small proportion of the gas stream from the first stage may be extracted in the cyclone separator to carry away the particulate matter. The heat from this stream could be utilized in the combined cycle via heat exchange with a steam loop.

Figure 1:
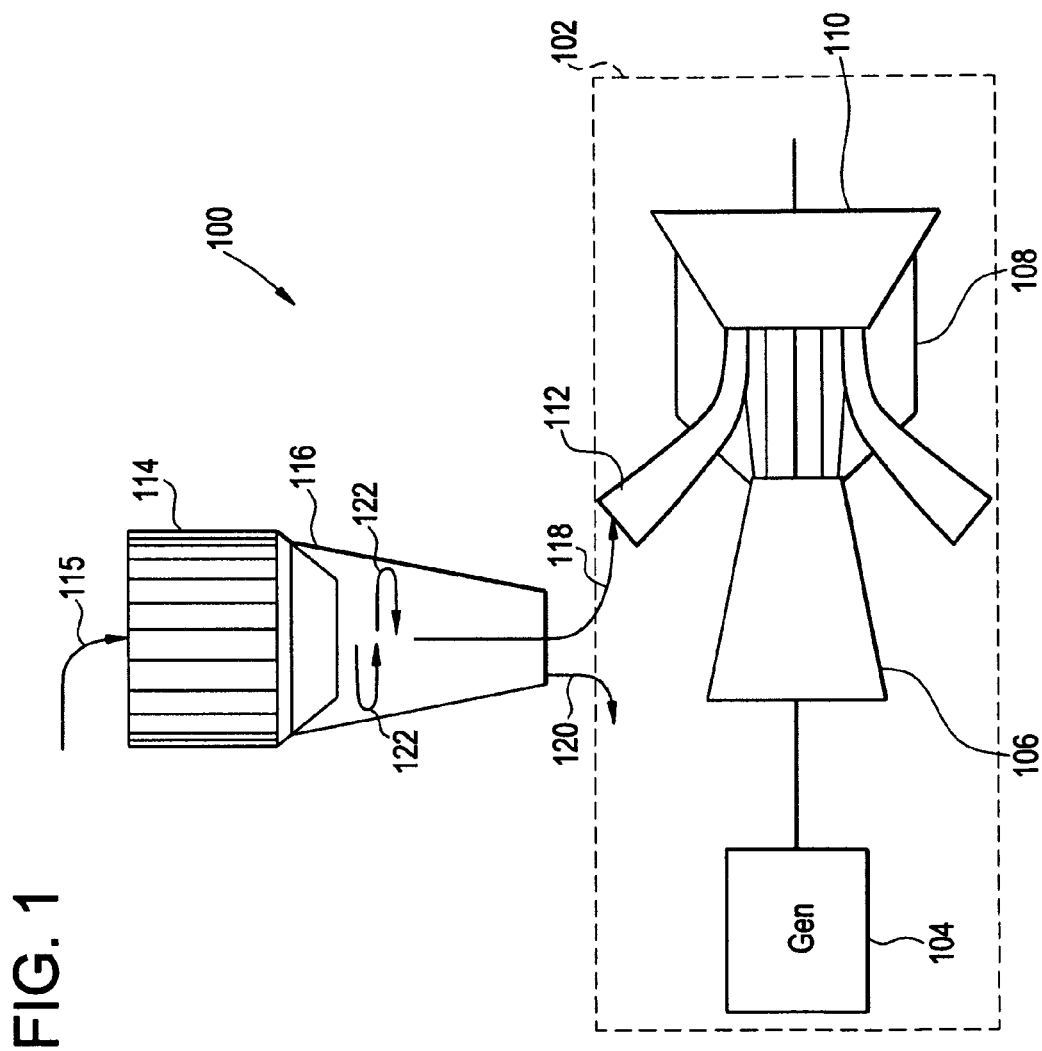
FIG. 1 shows an example of a system according to one embodiment of the present invention.

FIG. 1 shows an example of a system 100 according to one embodiment of the present invention. In one embodiment, the system 100 includes a gas turbine 102. The gas turbine 102 may include a generator 104 coupled to a compressor 106. The compressor 106 may be coupled to a combustion chamber 108.

The gas turbine 102, also called a combustion turbine, is a rotary engine that extracts energy from a flow of combustion gas. It has an upstream compressor 106 coupled to a downstream turbine 110 with the combustion chamber 108 in-between. Energy is added to the gas stream in the combustion chamber 108, where air from the compressor 106 is mixed with fuel and ignited. Combustion increases the temperature, velocity and volume of the gas flow. This is directed over the turbine's 110 blades (not shown), spinning the turbine 110 and powering the compressor 106.

In one embodiment, the combustion chamber 108 may include a second stage combustion input 112. This second stage combustion input 112 may be referred to herein as being part of the "can architecture" of the gas turbine 102.

The system 100 may also include a swirl chamber 114. The swirl chamber 114 may be implemented as a rich cyclone silo burner. The swirl chamber 114 may receive input fuel 115 at a first end thereof. The input fuel 115 may be a coal-water slurry and may include steam. In one embodiment, the coal-water slurry (input fuel 115) may mix with discharge air from the compressor 106 in the swirl chamber 114. When operated in this manner, the swirl chamber 114 acts as an air-blown gasifier. The gasification (combustion) that takes place in the swirl chamber 114 causes a synthesis gas to be created and may be part of the "rich stage" of the present invention. In one embodiment, the swirl chamber 114 acts as an air-blown gasifier with primarily CO and $H_2$ as combustible products, with an inert ($N_2$) carrier and produces the synthesis gas.

Swirling flow from the synthesis gas enters a cyclone separator 116 that is directly coupled to a second end of the swirl chamber 114. In the cyclone separator 116 the cyclonic flow (as indicated by arrows 122) of the swirling synthesis gas causes some or substantially all of the particulate matter to centrifuge to, and accumulate at, the periphery of the cyclone separator 116 for extraction through extraction port 120.

The rich stage (which includes both the swirl chamber 114 and the cyclone separator 116) may be either off board in a silo architecture or onboard and integrated with the can architecture of the gas turbine. The onboard embodiment may reduce the total volume and surface area of the hot gas stream. The output of the cyclone separator 116 shall be referred to as a rich gas stream 118.

In one embodiment, additional combustion air is mixed with the rich gas stream 118 from the rich stage to create a lean gas stream that is burned in the combustor 108. The combustion in the combustor 108 may be referred to herein as the "lean stage." Advantages of operating a system as shown in FIG. 1 may include, but are not limited to, reducing particulate load in the hot gas path in a direct coal-fired gas turbine, lower capital cost compared to conventional IGCC, better fuel efficiency due to less heat lost in the gasification and separation processes, better efficiency due to less ductwork and pressure losses, and the facilitation of coal utilization at overall better efficiency than any existing technology.

Figure 2:
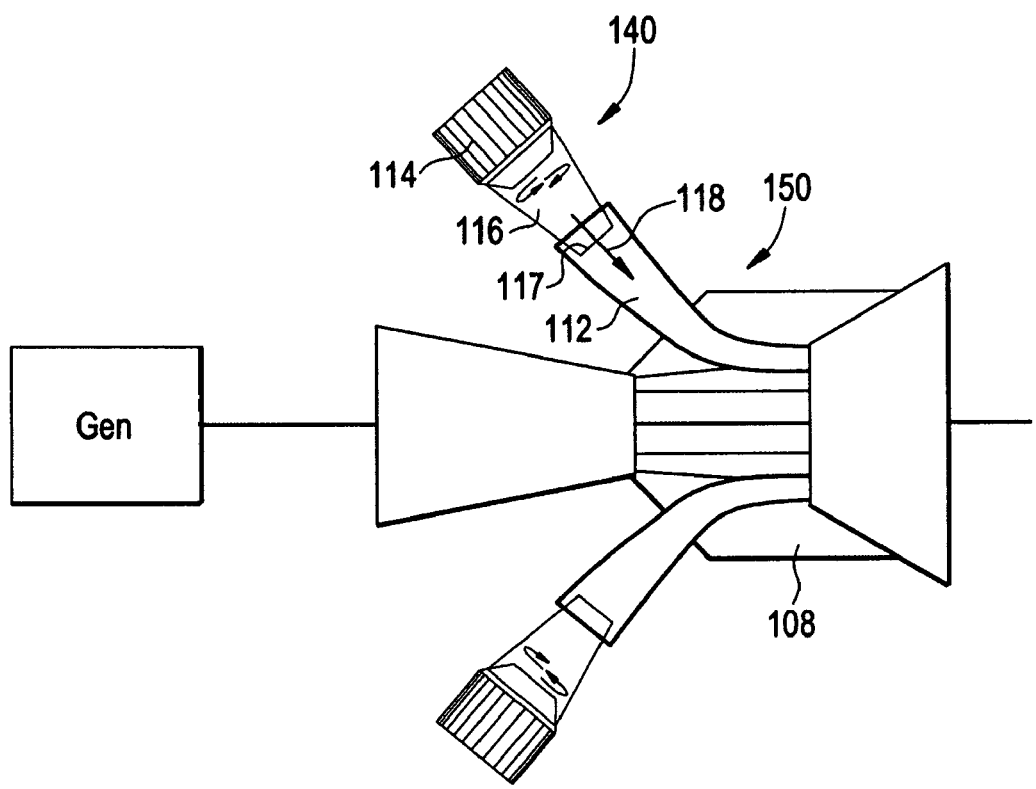
FIG. 2 shows an example of an onboard embodiment of the present invention.

FIG. 2 shows one embodiment of a system according to the present invention. The system of this embodiment is a so-called "on-board" embodiment in which the rich stage 140 is directly coupled to the lean stage 150. In particular, in this embodiment, the swirl chamber 114 is directly coupled to the cyclone separator 116. An exit end 117 of the cyclone separator 116 is displaced within a portion of the second stage combustion stage input 112. Of course, the extraction port 120 (FIG. 1) may be arranged such that particulate matter is removed from the cyclone separator 116 and not passed into the second stage combustion stage input 112.

In this embodiment, the rich gas stream 118 passing out of the exit end 117 of the cyclone separator 116 passes directly into the second stage combustion stage input 112. From there, the rich gas stream 118 travels into the combustion chamber where it is mixed with additional combustion air to create a lean gas stream that is ultimately burned in the combustor 108.

Figure 3:
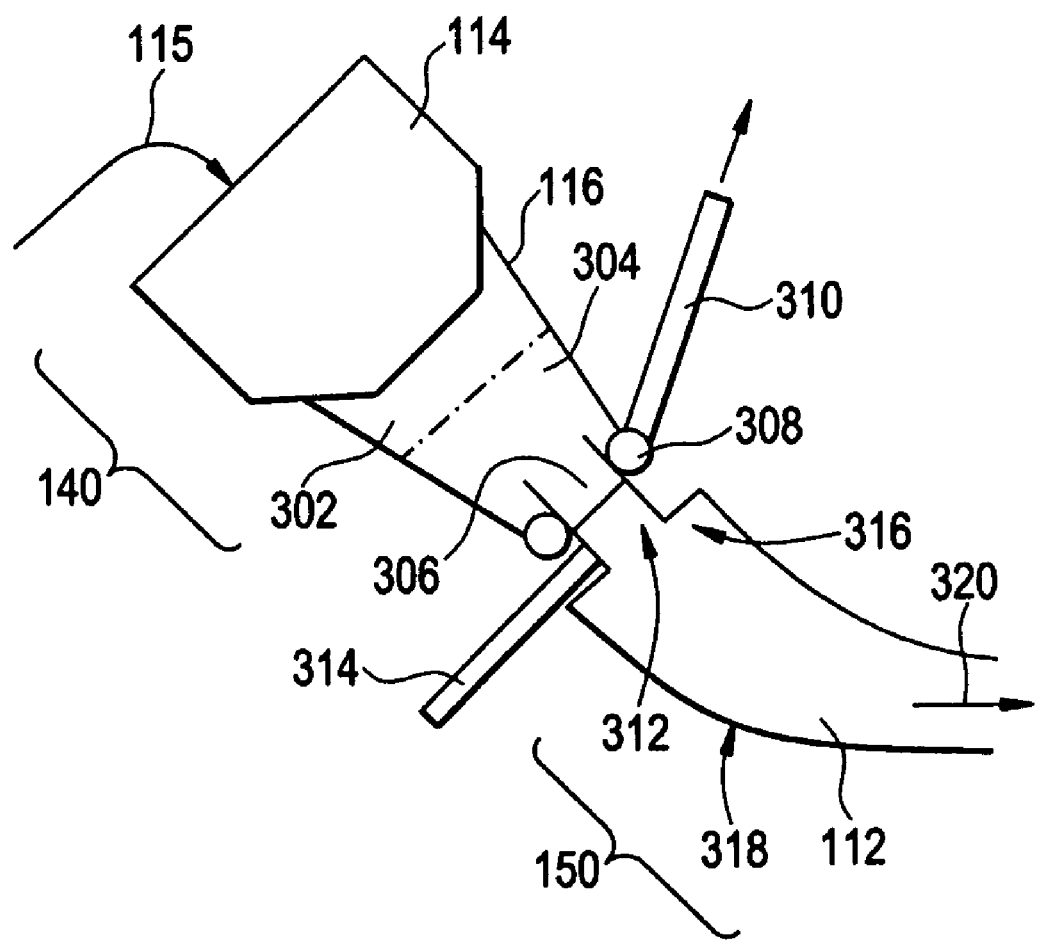
FIG. 3 shows a detailed view of the connection between the rich stage and the lean stage in an on-board embodiment of the present invention.

FIG. 3 shows a detailed view of the connection between the rich stage 140 and the lean stage 150 in a so-called "on-board" embodiment. Input fuel 115 (typically in the form a of coal-water slurry) mixes with compressor discharge air and steam in the swirl chamber 114. In this manner, the swirl chamber 114 acts as an air-blown gasifier. The swirl chamber 114 is directly coupled to the cyclone separator 116. The cyclone separator 116 may include an upper dump region 302 and base dump region 304. Output of the swirl chamber 114 enters the cyclone separator 116 in the upper dump region 302. In the upper dump region 302, rich partial oxidation and water-shift reactions are stabilized to convert coal+oxygen to $CO+H_2$.

The base dump region 304 includes a separator throat region 306 which is narrower than outer walls of the cyclone separator 116. Particulate matter, due centrifugal separation, tends to accumulate outside of the throat region 306 along the walls of the cyclone separator. At the bottom of the base dump region 304, a steam cooled extraction manifold 308 and extraction pipe 310 remove a small portion of the rich products, which are laden with a large portion of the particulate matter (solid materials) from the centrifugal separation.

An inlet throat 312 of the second stage combustion input 112 receives the rich mixture directly from the separator throat region 306. In one embodiment, additional compressor discharge air is injected to the rich mixture in region around the separator throat region 306 and the inlet throat 312 by, for example, compressor discharge air inlet 314. Thus, the region around the separator throat region 306 and the inlet throat 312 operates as a high-velocity venturi section leading out of the cyclone separator 116. In one embodiment, the mixing rate is high, limiting exposure to stoichiometric conditions. In one embodiment, lean reactions are completed in a second stabilized flame as the now lean flow passes into an upper portion 316 of the second stage combustion input 112.

The second stage combustion input 112 may also include, in one embodiment, one or more quench/dilution air inputs 318 that supply air to terminate the NOx reactions. In one embodiment, burned gases 320 leave the second stage combustion input 112 and pass into the turbine (not shown) via a conventional transition piece, largely devoid of particulate matter.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A coal combustion system, the system comprising: a swirl chamber having an input configured to receive a coal-water slurry, the swirl chamber causing the coal-water slurry to mix with discharge air from a compressor to gasify the coal-water slurry and create a synthesis gas, the swirl chamber also having a second end configured to expel the synthesis gas;

a cyclone separator directly coupled to the second end of the swirl chamber, the cyclone separator having an extraction port and causing particulate matter in the synthesis gas to accumulate at a periphery of the cyclone separator, the cyclone separator also having an output that outputs a rich gas stream, a separator throat region having an outer wall that is narrower than outer walls of the cyclone separator, a cooled extraction manifold outside of the separator throat region, and an extraction pipe coupled to the cooled extraction manifold configured to remove particulate matter; and a second stage combustion input coupled to the output of the cyclone separator; wherein the cyclone separator is directly coupled to the second stage combustion input.

2. The system of claim 1, further comprising:
a gas turbine coupled to the second stage combustion input.

3. The system of claim 2, wherein the rich gas stream is mixed with discharge air from the compressor to create a lean gas stream.

4. The system of claim 3, wherein the lean gas stream is combusted in a combustor of the gas turbine.

5. The system of claim 4, further comprising:
the compressor, the compressor being coupled to the combustor, the swirl chamber and the cyclone separator.

6. The system of claim 5, further comprising:
a generator coupled to the compressor.

7. The system of claim 1, wherein the second stage combustion input includes:
an inlet throat coupled to the separator throat region.

8. The system of claim 7, furher including:
a compressor discharge inlet in the inlet throat.

9. The system of claim 7, further including:
one or more quench/dilution air inputs in the second stage combustor input.

10. An integrated gasification combined cycle plant comprising:
a gas turbine having a second stage combustion input;
a swirl chamber having an input configured to receive a coal-water slurry, the swirl chamber causing the coal-water slurry to mix with discharge air from a compressor to gasify the coal-water slurry and create a synthesis gas, the swirl chamber also having a second end configured to expel the synthesis gas;
a cyclone separator directly coupled to the second end of the swirl chamber, the cyclone separator having an extraction port and causing particulate matter in the synthesis gas to accumulate at a periphery of the cyclone separator, the cyclone separator also having an output that outputs a rich gas stream to the second stage combustion input, a separator throat region having an outer wall thas is narrower than outer walls of the cyclone separator, a cooled extraction manifold outside of the separator throat region, and an extraction pipe coupled to the steam cooled extraction manifold configured to remove particulate matter.

11. The plant of claim 10, wherein the gas turbine includes:
the compressor;
a generator; and
a combustor coupled to the second stage combustion input.

12. The plant of claim 11, wherein the rich gas stream is mixed with discharge air from the compressor to create a lean gas stream.

13. The plant of claim 12, wherein the lean gas stream is combusted in the combustor.

14. The plant of claim 10, wherein the cyclone separator is directly coupled to the second stage combustion input.

15. The plant of claim 10, wherein the second stage combustion input includes:
an inlet throat coupled to the separator throat region.

16. The plant of claim 15, further including:
a compressor discharge inlet in the inlet throat.

17. The plant of claim 15, further including:
one or more quench/dilution air inputs in the second stage combustor input.

* * * * *